R. H. JUENGE.
SEPARABLE BLADE AND HANDLE.
APPLICATION FILED SEPT. 1, 1908.
909,908.
Patented Jan. 19, 1909.
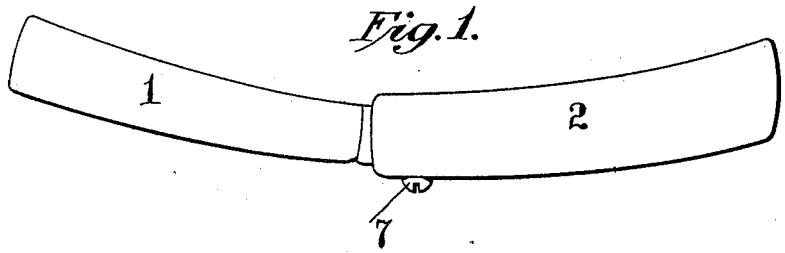
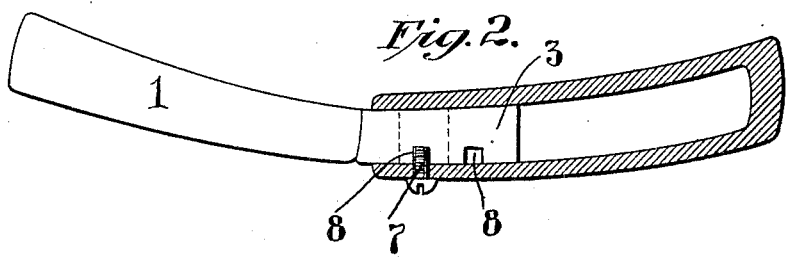
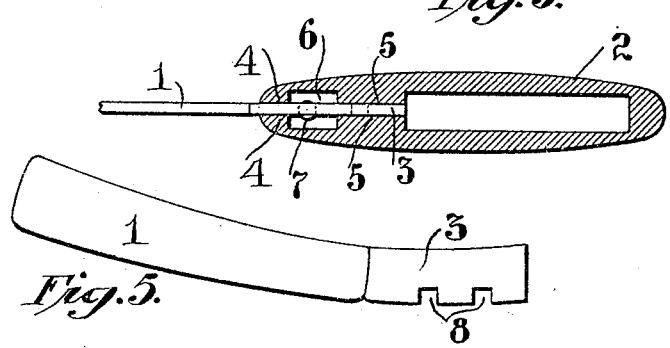
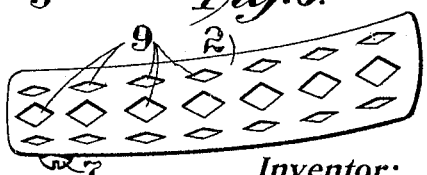
Attest:
Inventor:
R. H. Juenge
by
Attys

UNITED STATES PATENT OFFICE.

REINHOLD H. JUENGE, OF NEWARK, NEW JERSEY.

SEPARABLE BLADE AND HANDLE.

No. 909,908.     Specification of Letters Patent.     Patented Jan. 19, 1909.

Application filed September 1, 1908. Serial No. 451,156.

*To all whom it may concern:*

Be it known that I, REINHOLD H. JUENGE, a citizen of the United States of America, and a resident of Newark, county of Essex, and State of New Jersey, have invented a certain new and useful Improvement in Separable Blades and Handles, of which the following is a specification.

My invention relates to improvements in separable knife blades and handles and consists in a novel construction of engaging portions of a handle and a shank of a knife blade and in novel means for holding the knife blade in place.

The object of my invention is to provide improved means for holding such blades in place in their handles, to provide for adjustment of the length of blade projecting out from the handle, and to hold the blade rigidly to the handle.

I will now proceed to describe my invention with reference to the accompanying drawings illustrating one embodiment thereof, and will then point out the novel features in the claim.

In said drawings: Figure 1 is a side view of my improved knife blade and handle assembled together; Fig. 2 is a similar view showing the handle section longitudinally in the plane of the blade; Fig. 3 shows a cross section of the handle on a plane at right angles to that of Fig. 2, and shows a portion of the blade in place in the handle; and Fig. 4 shows a transverse section of the blade and handle; Fig. 5 shows a detail side view of the blade separated from the handle, and Fig. 6 is a detail side view of the handle illustrating the provision of perforations therein to lighten it.

In said drawings 1 designates the blade, and 2 the handle, the latter being hollow. Customarily this handle is formed of some cast metal, such as cast iron. The handle has a slot-shaped opening at one end to receive the shank 3 of the blade, and adjacent to this opening said handle is provided interiorly with fitting shoulders 4 and 5, the distance between the opposite sides being, as nearly as may be, the width of the shank 3 of the blade, so that no lateral motion of the blade in the handle is permitted. Back of the shoulders 5 the interior cavity of the handle is much larger, both in order that the handle may be relatively light, and in order that there may be relatively little difficulty in securing exact width of the space, between shoulders, which the shank of the blade is to occupy. Between the shoulders 4 and 5 the cavity in the handle is enlarged as at 6, both to avoid unnecessary width of fitting surfaces and to leave ample room for the screw 7 by which the blade is held to the handle. As shown particularly in Figs. 2 and 5, the shank of the blade is provided with two notches 8 adapted to receive the end of this screw 7, one or the other of said notches being opposite the screw, according as it is desired that the blade shall be seated far in the handle or shall project a greater distance therefrom.

It will be obvious that there may be a plurality of blades of different sizes, lengths, shapes, etc. for each handle, and customarily a set of such blades will be provided for each handle, one or the other being inserted therein, according to the work to be done. Customarily the handle will be lightened by providing holes or perforations 9 in its walls, as illustrated particularly in Fig. 6.

The construction shown enables the blades to be held very rigidly in the handle, the shank being engaged by shoulders 4 and 5 at points relatively distant from each other, and the construction shown making it easy to secure exact distance between the shoulders 4 and between the shoulders 5. Also the screw 7 may fit very closely to the notch which it enters, so preventing any longitudinal looseness of the blade. The construction shown is also very inexpensive, as the handle is readily cast at very small expense.

What I claim is:

A knife comprising a separable handle and blade, the handle being hollow and comprising a plurality of fitting surfaces arranged to engage different longitudinal portions of the shank of the blade, the bore of the handle being enlarged beyond the rearmost fitting surfaces and between different pairs of fitting surfaces, the blade having a shank adapted to fit closely between said fitting surfaces and having in one edge a plurality of notches adapted for engagement by a fastening screw, and a fastening screw passing through an orifice in said handle into engagement with one of the notches of said shank.

In testimony whereof I have signed this specification in the presence of two subscribing witnesses.

REINHOLD H. JUENGE.

Witnesses:
WILLIAM ULAND,
CHARLES H. STEWART.